(12) United States Patent
Kwon

(10) Patent No.: US 8,579,324 B2
(45) Date of Patent: Nov. 12, 2013

(54) SIDE AIRBAG

(75) Inventor: Hyock In Kwon, Seongnam-si (KR)

(73) Assignees: Hyundai Motor Company, Seoul (KR); Kia Motors Corp., Seoul (KR)

(*) Notice: Subject to any disclaimer, the term of this patent is extended or adjusted under 35 U.S.C. 154(b) by 0 days.

(21) Appl. No.: 13/601,347

(22) Filed: Aug. 31, 2012

(65) Prior Publication Data

US 2013/0257027 A1 Oct. 3, 2013

(30) Foreign Application Priority Data

Mar. 28, 2012 (KR) ........................ 10-2012-0031663

(51) Int. Cl.
*B60R 21/2338* (2011.01)
*B60R 21/207* (2006.01)
*B60R 21/233* (2006.01)

(52) U.S. Cl.
USPC .................... 280/743.2; 280/729; 280/730.2; 280/730.1

(58) Field of Classification Search
USPC .............. 280/743.2, 729, 730.2, 739, 730.1
See application file for complete search history.

(56) References Cited

U.S. PATENT DOCUMENTS

| | | | |
|---|---|---|---|
| 5,586,782 A * | 12/1996 | Zimmerman et al. ...... | 280/730.2 |
| 5,593,179 A * | 1/1997 | Maruyama ................. | 280/740 |
| 6,270,113 B1 * | 8/2001 | Wipasuramonton et al. ....................... | 280/730.2 |
| 6,439,605 B2 * | 8/2002 | Ariyoshi ..................... | 280/739 |
| 6,991,257 B2 * | 1/2006 | Zhao et al. ................. | 280/730.2 |
| 7,168,733 B2 * | 1/2007 | Kumagai et al. ........... | 280/730.2 |
| 7,594,677 B2 * | 9/2009 | Sendelbach et al. ....... | 280/743.1 |
| 7,654,562 B2 * | 2/2010 | Klima et al. ................ | 280/730.2 |
| 7,793,973 B2 * | 9/2010 | Sato et al. .................. | 280/730.2 |
| 7,891,704 B2 * | 2/2011 | Taguchi et al. ............. | 280/739 |
| 2004/0021304 A1 * | 2/2004 | Tanase et al. ............... | 280/729 |
| 2006/0255572 A1 * | 11/2006 | Svenbrandt et al. ....... | 280/730.2 |
| 2007/0267854 A1 * | 11/2007 | Fukuda et al. ............. | 280/730.2 |
| 2010/0090448 A1 * | 4/2010 | Pursche et al. ............. | 280/730.2 |
| 2011/0169250 A1 * | 7/2011 | Breuninger et al. ....... | 280/730.2 |
| 2012/0013107 A1 * | 1/2012 | Shankar ..................... | 280/730.2 |

FOREIGN PATENT DOCUMENTS

KR 100862504 (B1) 10/2008
KR 1020090027979 (A) 3/2009

* cited by examiner

*Primary Examiner* — Drew Brown
(74) *Attorney, Agent, or Firm* — Morgan, Lewis & Bockius LLP

(57) ABSTRACT

A side airbag apparatus may include a main chamber that is provided on a side of a seat and aligned toward a door to be deployed theretoward when a vehicle collides, to protect a passenger from a side directional collision, an auxiliary chamber that is connected to a rear part of the main chamber to be fluid-communicated to each other, wherein the auxiliary chamber is provided on a side of the main chamber toward the inside of the seat to push the passenger toward the inside of the seat when the auxiliary chamber is deployed, and a volume control tether provided in the rear part of the main chamber, wherein both ends of the volume control tether are fixed to facing-inner walls of the main chamber, respectively to restrict a deployment width of the rear part of the main chamber.

15 Claims, 4 Drawing Sheets

SIDE AIRBAG

CROSS-REFERENCE TO RELATED APPLICATION

The present application claims priority to Korean Patent Application No. 10-2012-0031663, filed on Mar. 28, 2012, the entire contents of which is incorporated herein for all purposes by this reference.

BACKGROUND OF THE INVENTION

1. Field of the Invention

The present disclosure relates to a side airbag for promptly restricting and protecting a passenger while a vehicle collides.

2. Description of Related Art

Generally, various airbags for protecting a passenger while a vehicle collides have been provided in a vehicle. Among these airbags, a side airbag for protecting a passenger from a side directional collision is provided on a side of a seat and serves to protect the passenger from pieces of broken glass and an impact produced when a door is fractured and directed inward.

FIG. 1 is a side view showing an airbag according to a prior art wherein a gas injected into a main chamber 10 expands the lower part 18 of the main chamber and then flows into the upper part 16 to be discharged through a vent hole 11 formed on the upper part of a baffle 40. Therefore, the gas is not to be circulated through the entire inner part of the main chamber 10.

As a result, the side airbag is not to be deployed fully at a proper time. Accordingly, there has been a need in this side airbag that the gas is not to be discharged unnecessarily and is circulated through the entire inner part of the chamber for deploying it promptly.

Meanwhile, as the side airbag according to a prior art, two kinds of airbag modules have been used that one is for moving a passenger toward a direction opposed to a collision and the other is for protecting the passenger from the collision. As a result, two air bags and two inflators are necessary and it causes to increase the weight and cost.

Furthermore, a technology for a side airbag has been implemented that the airbag attached to a seat pad of a dynamic contour system component for a seat is expanded in a seat cover to push a passenger; however, it is applicable only to the dynamic contour system and further it is difficult for impact damping performance to be tuned due to a deletion of the side airbag.

Another technology for a side airbag has been proposed that a side airbag is deployed on the inside of a seat bag frame, after a vehicle collides, to be rapidly in contact with a passenger and move the passenger to a direction opposite to the collision for protecting him/her; however, in this technology, the function for moving a passenger to the direction opposite to the collision is not sufficient.

As a result, in order to solve the above described drawbacks, a side airbag of dual chambers has been proposed to move a passenger to a direction opposite to a collision for protecting him/her.

Here, there is a difficulty in assembling a seat package for the side airbag of dual chambers even though it is mounted on an outside and inside of a seat frame to surround it. Accordingly, it is possible for the side airbag to be mounted on an outside of a side seat frame to ensure the same seat package as the existing side airbag, unlike prior technology.

However, as shown in FIG. 2 that illustrates a plain view of another side airbag according to a prior art, in the conventional side airbag of dual chambers, an overlapping portion 20' of a main chamber 10' and an auxiliary chamber 30' is produced when the side airbag is deployed and to inhibit deployments of the main chamber 10' and the auxiliary chamber 30' to each other and thus it is difficult for the auxiliary chamber 30' to move a passenger P'.

Specially, an expansion pressure of the main chamber 10' that is deployed toward a door presses the auxiliary chamber 30' for pushing the passenger P' and thus the auxiliary chamber 30' excessively presses the passenger P' to damage him/her.

Accordingly, there is a need to improve a deployment of the main chamber 10' and prevent the passenger P' from being damaged by the auxiliary chamber 30' by controlling the volumes of the main chamber 10' and the auxiliary chamber 30'.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a side airbag apparatus having a main chamber that is provided on a side of a seat and aligned toward a door to be deployed theretoward when a vehicle collides, to protect a passenger from a side directional collision, an auxiliary chamber that is connected to a rear part of the main chamber to be fluid-communicated to each other, wherein the auxiliary chamber is provided on a side of the main chamber toward the inside of the seat to push the passenger toward the inside of the seat when the auxiliary chamber is deployed, and a volume control tether provided in the rear part of the main chamber, wherein both ends of the volume control tether are fixed to facing-inner walls of the main chamber, respectively to restrict a deployment width of the rear part of the main chamber.

The volume control tether may have a trapezoid sectional shape such that a front part thereof is formed wider than a rear part thereof.

The volume control tether is provided at an overlapping position of the main chamber and the auxiliary chamber while the main chamber and the auxiliary chamber are deployed fully.

The volume control tether is provided with a guide face at the front thereof for guiding a gas input into a lower part of the main chamber to be flowed upward, wherein a vent hole through which the gas is discharged is formed to the main chamber and the guide face faces the vent hole.

A front part of the volume control tether is elongated downward longer than a rear part thereof to guide a gas input into a lower part of the main chamber to rise.

The volume control tether is provided with a split part at a rear part thereof for splitting a gas input into the main chamber and supplying the gas to an upper part and a lower part of the main chamber.

A rear part of the volume control tether may have the same height as the auxiliary chamber.

A rear part of the volume control tether is formed at a position, corresponding to a chest of the passenger.

A baffle is provided on the main chamber for dividing an internal part of the main chamber into an upper part and a lower part, and an opening through which a gas flows up-downward is provided through the baffle.

The baffle divides the internal part of the main chamber such that the upper part of the main chamber corresponds to a chest of the passenger and the lower part thereof corresponds to a pelvis of the passenger.

A rear part of the baffle is connected to the volume control tether and a front part thereof is inclined downward.

A rear part of the baffle is connected to a rear part of the volume control tether.

A rear part of the baffle is connected to a front part of the volume control tether.

The rear part of the baffle is connected to a lower part of the volume control tether so that the lower part of the main chamber is deployed fully faster than the upper part thereof.

A vent hole through which a gas is discharged is formed through the main chamber at the upper part thereof, based on the baffle so that the lower part of the main chamber is deployed fully faster than the upper part thereof.

A vent hole through which the gas is discharged is formed through the main chamber and a front part of the volume control tether faces the vent hole.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
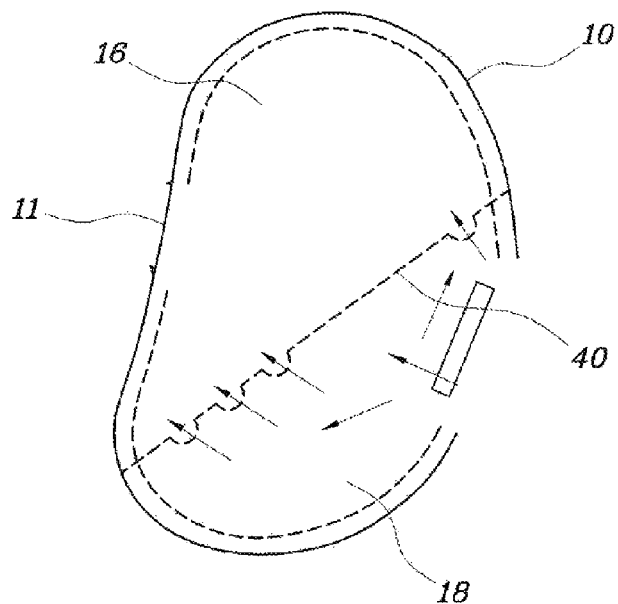
FIG. 1 is a view showing a side airbag according to a related art.
Figure 2:
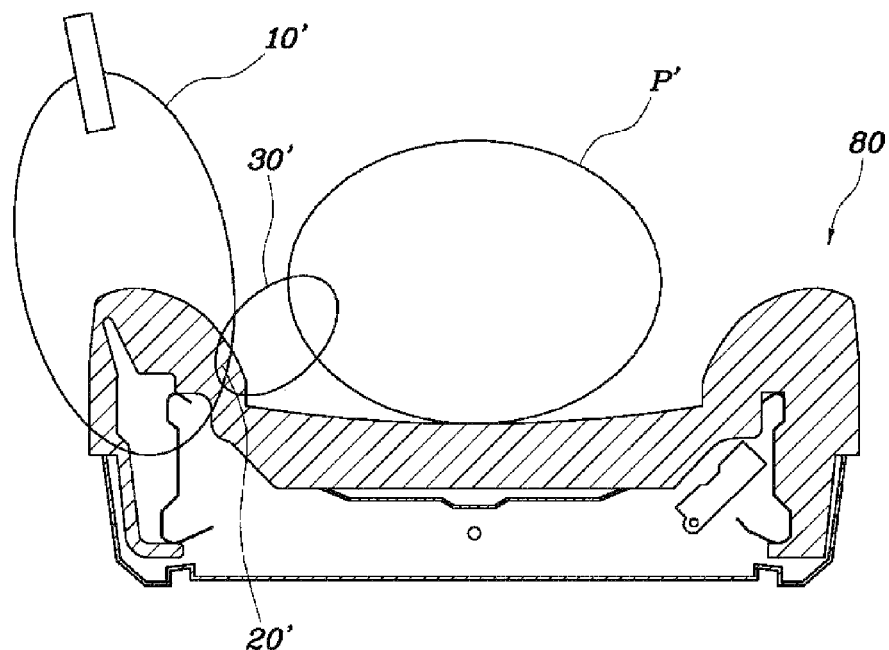
FIG. 2 is a plain view showing another side airbag according to a related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter reference will now be made in detail to various embodiments of the present invention, examples of which are illustrated in the accompanying drawings and described below.

Figure 3:
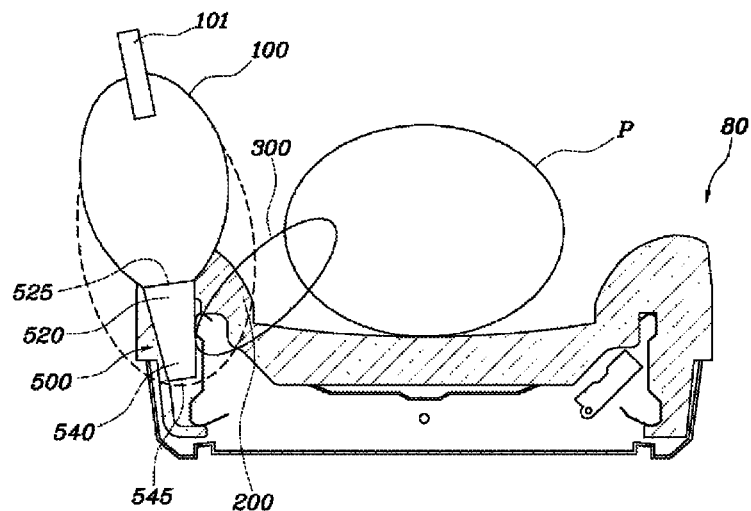
FIG. 3 is a plain view showing a side airbag according to various exemplary embodiments of the present invention.

FIG. 3 is a plain view showing a side airbag installed in a seat 80 according to a first embodiment of the present invention wherein the side airbag includes: a main chamber 100 that is provided on a seat side and deployed toward a door for protecting a passenger P from a side collision when a vehicle collides, an auxiliary chamber 300 that is connected to be communicated to a rear part 140 of the main chamber 100 wherein it is directed toward a side of the passenger P among the rear part 140 of the main chamber 100 to push the passenger P toward the inside of a vehicle when the side airbag is deployed, and a volume control tether 500 which is provided on inner side of the rear part 140 of the main chamber 100 and both ends of which are fixed to the facing-inner walls of the main chamber 100, respectively, to restrict a deployment width of the rear part 140 of the main chamber 100.

As shown in FIG. 3, a front part 520 of the volume control tether 500 is wider than a rear part 540 thereof to enlarge the deployment width of the main chamber 100 thereby protecting the passenger P from a side collision.

Meanwhile, the rear part 540 of the volume control tether 500 is narrower than the front part 520 thereof to restrict a volume of the rear part 140 of the main chamber 100.

As a result, the gas input in the chamber passes through the rear part 140 of the main chamber 100, which is restricted in width by the volume control tether 500, to increase flow velocity thereof and the gas having increased velocity is input rapidly in the chamber for the main chamber 100 to be deployed promptly.

The volume control tether 500 as described-above has a trapezoid sectional shape such that the front part 520 is wider than the rear part 540 and the rear part 540 is narrower than the front part 520.

Obviously, the volume control tether 500 may be formed as other shapes, in addition to the trapezoid shape, however, the trapezoid shape in which the front part 520 is wide and the rear part 540 is narrow is ideal configuration for the volume control tether 500 since a deployment width of the front part 120 of the main chamber 100 is ensured and the rear part 140 of the main chamber 100 is restricted when the chamber is deployed.

The volume control tether 500 is sewn to a portion of the inside of the main chamber 100 where the main chamber 100 and the auxiliary chamber 300 are overlapped while the main chamber 100 and the auxiliary chamber 300 are fully developed.

As a result, the volume control tether 500 allows the main chamber 100 not to be inhibited by the auxiliary chamber 300 while it is deployed, the rear part 140 of the main chamber 100 to be restricted, and the passenger P not to be damaged by the auxiliary chamber 300 being pushed by the expansion pressure of the main chamber 100.

Figure 4:
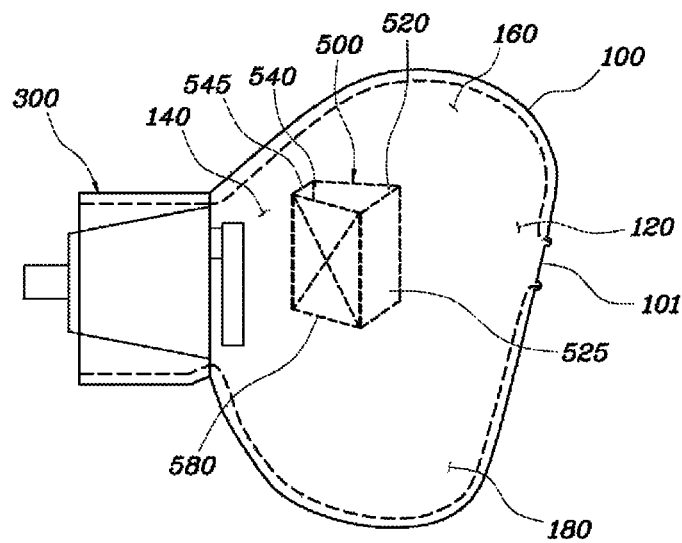
FIG. 4 is a view showing a volume control tether of the side airbag in FIG. 3.

FIG. 4 is a view showing a volume control tether of a side airbag, shown in FIG. 3, wherein the volume control tether 500 is provided with a front end 525 of a predetermined face, that is, a guide face 525 for guiding upward the gas input to the lower part 180 of the main chamber 100.

This guide face 525 prevents the gas input in the main chamber 100 from being discharged through a vent hole 101 without expanding fully the upper part 160 of the main chamber 100 so that the gas is to be circulated through the entire inside of the main chamber 100 to deploy fully the main chamber 100.

Further, the front part 520 of the volume control tether 500 is elongated downward longer than the rear part 540 so that it guides the gas input to the lower part 180 of the main chamber 100 to rise to the upper part 160 of the main chamber 100 along the guide face 525 formed on the front end of the volume control tether 500.

As a result, in the main chamber 100, the gas injected to the lower part 180 is input rapidly along the guide face 525 to deploy promptly the main chamber 100 and protect the passenger P from collision impact.

Meanwhile, the volume control tether 500 is provided with a rear end 545 of a predetermined surface, that is, a split face 545 for splitting and supplying the gas input into the main chamber 100 into the upper part 160 and the lower part 180 of the main chamber 100.

As a result, the gas input in the main chamber 100 is not to be accumulated on the lower part 180 of the main chamber 100 and a part of the gas is input to the upper part 160 of the main chamber 100 to guide it to be deployed promptly.

Here, the rear part 540 of the volume control tether 500 has the same height as the auxiliary chamber 300 and further is formed at a position, corresponding to a chest of the passenger P.

The volume control tether 500 reduces the overlapping portion 200 of the main chamber 100 and the auxiliary chamber 300 when they are deployed fully to decrease the interference from the expansion pressure of the main chamber 100 to the auxiliary chamber 300 and guides the auxiliary chamber 300 and the lower part 180 of the main chamber 100 to push simultaneously a chest and a pelvis of the passenger P when they are deployed.

In detailed description that the lower part 180 of the main chamber 100 and the auxiliary chamber 300 pushes simultaneously the passenger P, as shown in FIG. 4, the volume control tether 500 is provided on the inside of the rear part 140 of the main chamber 100 and is sewn to a position, corresponding to a chest of the passenger P, to push the chest of the passenger P while avoiding the passenger P being damaged by the auxiliary chamber 300 with expansion pressure of the main chamber 100.

Meanwhile, the gas is injected simultaneously into the upper part 160 and the lower part 180 of the main chamber 100 wherein the gas is injected much more into the lower part 180 than into the upper part 160 of the main chamber 100 and further a space is formed smaller in the lower part 180 than in the upper part 160 of the main chamber 100 so that the lower part 180 of the main chamber 100 is more rapidly deployed than the upper part 160 of the main chamber 100 for the lower part 180 of the main chamber 100 to push a pelvis of the passenger P to the inside of a vehicle.

That is, the lower part 180 of the main chamber 100 and the auxiliary chamber 300 push simultaneously a chest and a pelvis of the passenger P and the internal gas of the auxiliary chamber 300 replenishes an insufficient gas volume of the main chamber 100 through the impact produced while the auxiliary chamber 300 pushes the passenger P.

Figure 5:
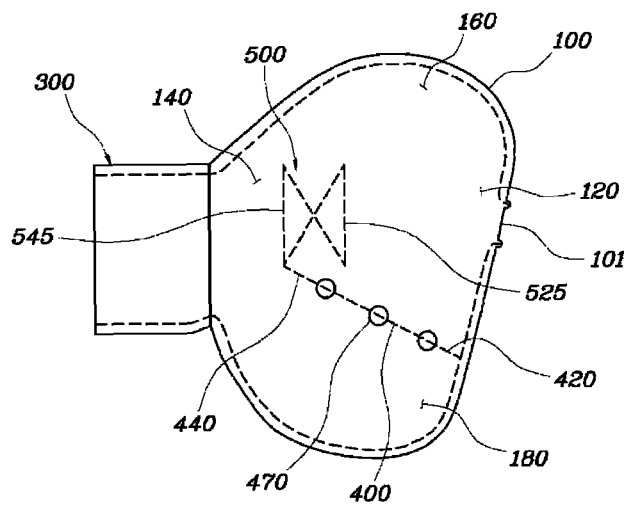
FIG. 5 is a view showing a side airbag according to various exemplary embodiments of the present invention.

FIG. 5 is a view showing a side airbag according to a second embodiment of the present invention wherein the side airbag is provided with a baffle for dividing the internal part of the main chamber 100 into an upper part 160 and a lower part 180 and an opening through which the gas injected into the main chamber 100 is flowed into the upper part 160 and the lower part 180.

The baffle is formed such that the upper part 160 of the main chamber 100 corresponds to a chest of the passenger P and the lower part 180 thereof corresponds to a pelvis of the passenger P.

In the side airbag as described-above, the volume tether 500 is connected to the upper part 160 of the main chamber 100, based on the baffle 400, a small space is formed on the lower part 180, and the gas is injected simultaneously into the main chamber 100 and the auxiliary chamber 300.

A rear part 440 of the baffle 400 is connected to the volume control tether 500 and a front part 420 of the baffle 400 is inclined downward such that the lower part 180 of the main chamber 100 is formed smaller than the upper part 160.

In more detailed description, the front part 420 of the baffle 400 is inclined downward to having an angle and thus the opening formed on the baffle 400 has the angle. As a result, the gas injected to the lower part 180 of the main chamber 100 is input easily to the upper part 160 of the main chamber through the opening 470 of the baffle 400, having the angle.

Further, since the vent hole 101 through which the gas is discharged is formed on the upper part 160 of the main chamber 100, based on the baffle 400, the lower part 160 of the main chamber 100 is deployed fully faster than the upper part 160 of the main chamber 100.

The configuration as described-above is a technology to achieve an object of the present invention that the lower part 180 of the main chamber 100 is deployed faster than the upper part 160 of the main chamber to push a pelvis of the passenger P and further the gas flowing in the main chamber 100 is avoided discharging through the vent hole 101 formed on the upper part 160 of the main chamber 100 without circulating the internal part of the main chamber 100.

In addition, the rear part 440 of the baffle 400 is connected to the lower part 580 of the volume control tether 500 and the lower part 180 of the main chamber 100 is formed smaller than the upper part 160 to be deployed fully at first.

Figure 6:
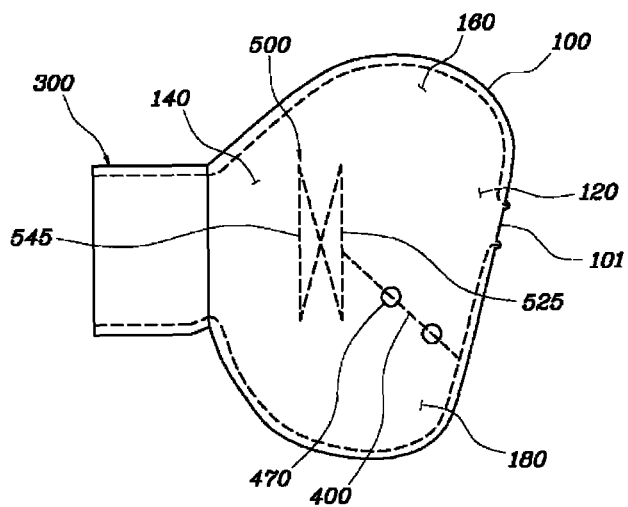
FIG. 6 is a view showing a side airbag according to various exemplary embodiments of the present invention.

FIG. 6 is a side view showing a side airbag according to a third embodiment of the present invention wherein the front part 520 and the rear part 540 of the volume control tether 500 are elongated downward and a width of the volume control tether 500 is narrow and the baffle 400 is connected to the front end 525, that is, the guide face 525, of the volume control tether 500.

In this side airbag, the rear end 545, that is, the split face 545 of the volume control tether 500 controls a gas flow such that the lower part 180 of the main chamber 100 is deployed primarily and more gas is input into the upper part 160 of the main chamber 100 to deploy it promptly.

Figure 7:
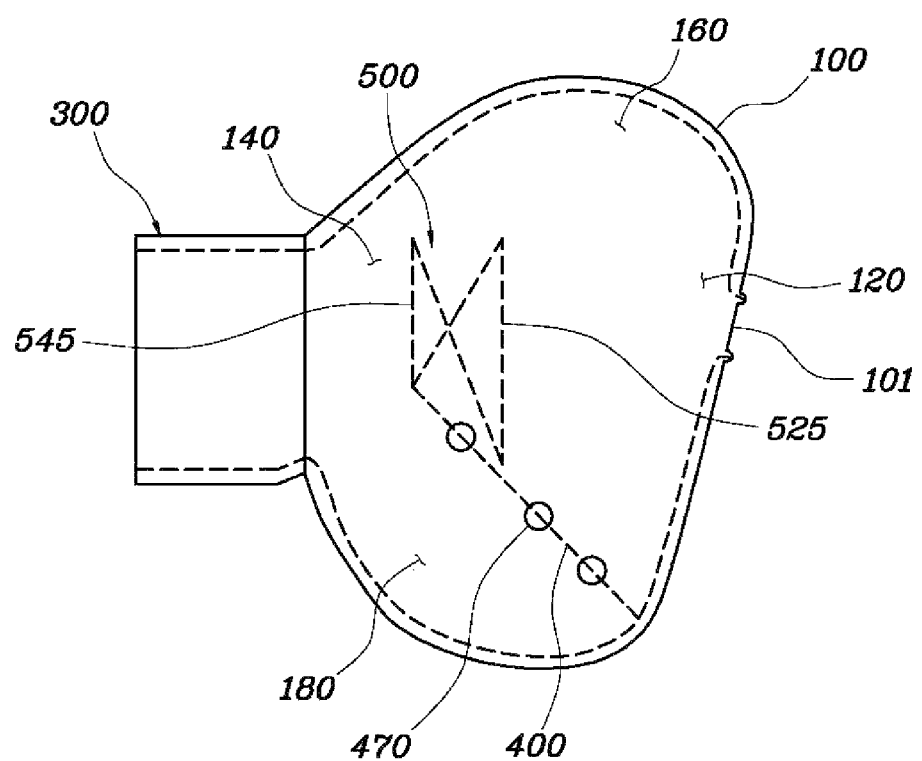
FIG. 7 is a view showing a side airbag according to various exemplary embodiments of the present invention.

FIG. 7 is a side view showing a side airbag according to a fourth embodiment of the present invention wherein a front part 520 of the volume control tether 500 is elongated downward, the rear part 540 has the same height as the auxiliary chamber 300 and the baffle 400 is connected to the lower part 580 of the split face 545 of the volume control tether 500, which considers to be ideal configuration for the present invention.

In this side airbag, the front end 525 of the volume control tether 500, that is, the guide face 525 is formed to guide the gas injected to the lower part 180 of the main chamber 100 to rise to the upper part 160 and further the rear part 440 of the baffle 400 is connected to a lower part of the volume control tether 500 such that the front part 420 of the baffle 400 is inclined downward for the lower part 180 of the main chamber 100 to be formed narrower than the upper part.

As a result, the lower part 180 of the main chamber 100 is deployed at first, the upper part 160 is guided to be deployed secondly, and the input gas is circulated smoothly through the opening formed on the baffle 400 having an inclination angle.

According to the side airbag as described-above, a deployment of a main chamber is improved by controlling a volume thereof through a volume control tether connected thereto and a passenger is avoided being damaged through an auxiliary chamber.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A side airbag apparatus comprising:
    a main chamber that is provided on a side of a seat and aligned toward a door to be deployed theretoward when a vehicle collides, to protect a passenger from a side directional collision;
    an auxiliary chamber that is connected to a rear part of the main chamber to be fluid-communicated to each other, wherein the auxiliary chamber is provided on a side of the main chamber toward the inside of the seat to push the passenger toward the inside of the seat when the auxiliary chamber is deployed; and
    a volume control tether provided in the rear part of the main chamber, wherein both ends of the volume control tether are fixed to facing-inner walls of the main chamber, respectively to restrict a deployment width of the rear part of the main chamber;
    wherein a baffle is provided on the main chamber for dividing an internal part of the main chamber into an upper part and a lower part, and an opening through which a gas flows up-downward is provided through the baffle; and
    wherein a rear part of the baffle is connected to the volume control tether and a front part thereof is inclined downward.

2. The side airbag apparatus of claim 1, wherein the volume control tether has a trapezoid sectional shape such that a front part thereof is formed wider than a rear part thereof.

3. The side airbag apparatus of claim 1, wherein the volume control tether is provided at an overlapping position of the main chamber and the auxiliary chamber while the main chamber and the auxiliary chamber are deployed fully.

4. The side airbag apparatus of claim 1, wherein the volume control tether is provided with a guide face at the front thereof for guiding a gas input into a lower part of the main chamber to be flowed upward.

5. The side airbag apparatus of claim 4, wherein a vent hole through which the gas is discharged is formed to the main chamber and the guide face faces the vent hole.

6. The side airbag apparatus of claim 1, wherein a front part of the volume control tether is elongated downward longer than a rear part thereof to guide a gas input into a lower part of the main chamber to rise.

7. The side airbag apparatus of claim 1, wherein the volume control tether is provided with a split part at a rear part thereof for splitting a gas input into the main chamber and supplying the gas to an upper part and a lower part of the main chamber.

8. The side airbag apparatus of claim 1, wherein a rear part of the volume control tether has the same height as the auxiliary chamber.

9. The side airbag apparatus of claim 1, wherein a rear part of the volume control tether is formed at a position, corresponding to a chest of the passenger.

10. The side airbag apparatus of claim 1, wherein the baffle divides the internal part of the main chamber such that the upper part of the main chamber corresponds to a chest of the passenger and the lower part thereof corresponds to a pelvis of the passenger.

11. The side airbag apparatus of claim 1, wherein a rear part of the baffle is connected to a rear part of the volume control tether.

12. The side airbag apparatus of claim 1, wherein a rear part of the baffle is connected to a front part of the volume control tether.

13. The side airbag apparatus of claim 1, wherein the rear part of the baffle is connected to a lower part of the volume control tether so that the lower part of the main chamber is deployed fully faster than the upper part thereof.

14. The side airbag apparatus of claim 1, wherein a vent hole through which a gas is discharged is formed through the main chamber at the upper part thereof, based on the baffle so that the lower part of the main chamber is deployed fully faster than the upper part thereof.

15. The side airbag apparatus of claim 1, wherein a vent hole through which the gas is discharged is formed through the main chamber and a front part of the volume control tether faces the vent hole.

* * * * *